May 4, 1965 — C. B. VOGEL — 3,182,285
WELL LOGGING
Filed March 14, 1955 — 3 Sheets-Sheet 1
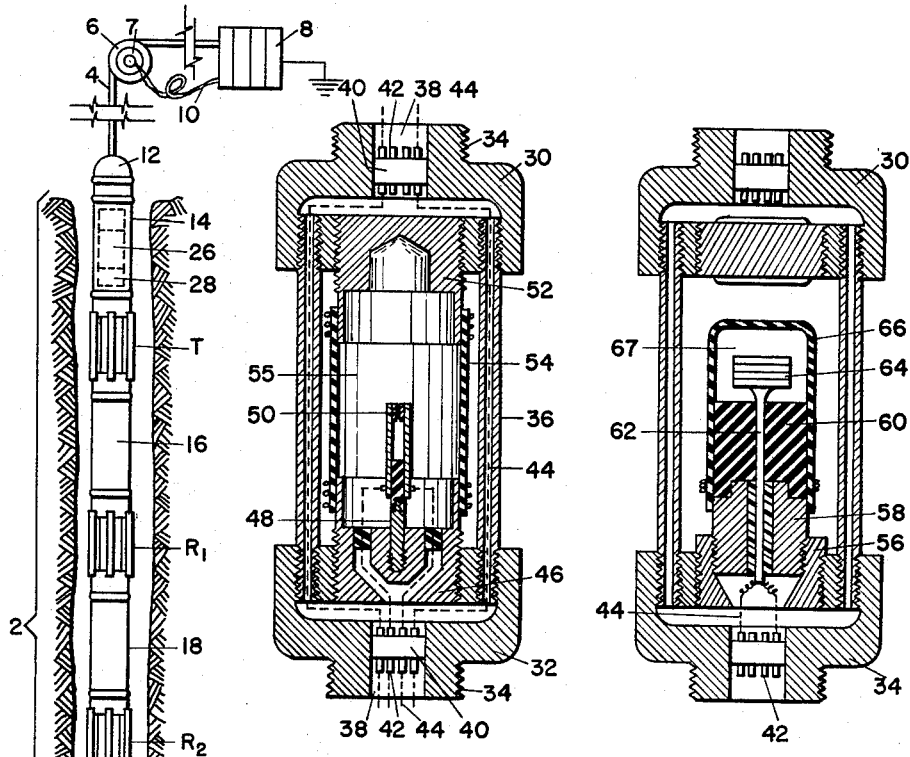
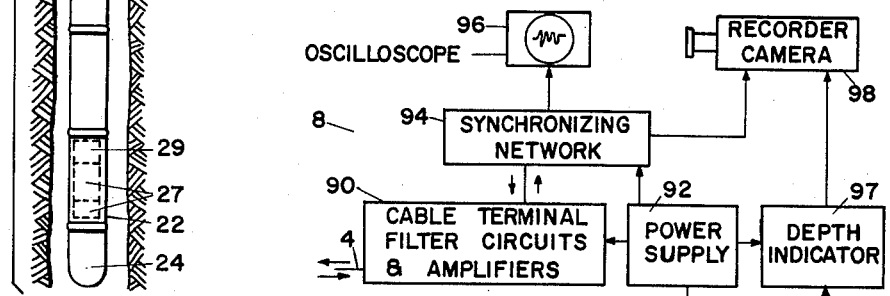
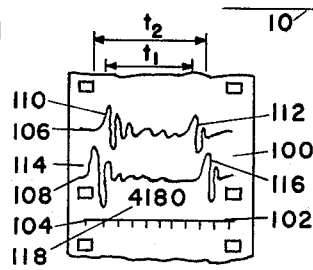
INVENTOR:
CHARLES B. VOGEL
BY: [signature]
HIS ATTORNEY May 4, 1965 C. B. VOGEL 3,182,285
WELL LOGGING
Filed March 14, 1955 3 Sheets-Sheet 2

INVENTOR:
CHARLES B. VOGEL
BY:
HIS ATTORNEY

May 4, 1965

C. B. VOGEL 3,182,285

WELL LOGGING

Filed March 14, 1955

INVENTOR:
CHARLES B. VOGEL
BY:
HIS ATTORNEY

United States Patent Office 3,182,285
Patented May 4, 1965

3,182,285
WELL LOGGING
Charles B. Vogel, Houston, Tex., assignor to Shell Oil Company, a corporation of Delaware
Filed Mar. 14, 1955, Ser. No. 493,999
18 Claims. (Cl. 340—18)

This application is a continuation-in-part of my copending application Serial No. 284,867, filed April 29, 1952, now Patent 2,708,485, issued May 17, 1955, which is in turn a continuation-in-part of my Patent 2,651,027, issued September 1, 1953.

This invention pertains to the logging of earth formations traversed by a borehole, and relates more particularly to a method and an apparatus for generating acoustic or mechanical impulses within a borehole, and for measuring and recording the velocity of travel of these impulses through the borehole fluids and the surrounding formations with a view to investigating and logging certain characteristics of said formations.

The seismic velocity logging method described in said copending application uses a transmitter capable of producing discrete sound pulses within a borehole, and associated receivers and recording equipment for observing the various seismic waves generated thereby. It is thus a transient method of measurement which allows the resolution of various types of sound waves traveling within a borehole. Such resolution is not easily accomplished with continuous waves, especially where it is desired to use a small measuring interval for good resolution of thin layers. With a transient method, on the other hand, it is possible to measure the velocities of transmission of compressional and shear waves in different types of rocks or formations. In some types of rock, the various types of waves give distinctive oscillographic patterns by which the rock type may be identified.

The apparatus of said application Serial No. 284,867 uses as a sound source the small scale explosions caused within a liquid by an electric arc produced by discharging a capacitor through electrodes immersed in the liquid. Such a sound source produces pulses having a rise time of a few microseconds, that is, an extremely steep front. Under conditions of low hydrostatic pressure, it is possible to obtain an instantaneous acoustic output of the order of a megawatt from such source. However, hydrostatic pressure has the effect of changing the sound pulse from a simple non-oscillatory pulse to a rapidly oscillating one whose period and amplitude decrease with increasing pressure. The result is that the effective power of the transmitter decreases in an oil well about 3 decibels per thousand feet depth. The receiver used consists preferably of a piezoelectric hydrophone-type detector provided with electronic amplification means, the receiver being suitably spaced from the transmitter. As the apparatus is moved through the borehole the transmitter produces, at suitable intervals such as 5 feet, a mechanical or acoustic impulse or seismic wave which travels toward the receiver through the well fluid and the surrounding formations, while a signal corresponding to the electrical discharge causing said impulse is relayed to the surface through a well-logging cable. At the receiver, the acoustic impulse is converted to an electrical signal which is relayed to the surface over the same cable and is displayed in a cathode ray oscilloscope which is photographed in such a manner as to give a series of individual frames carrying also other data such as the depth of the instrument, timing calibration signals, etc. Thus the record obtained consists of a strip of film on which is printed a series of miniature refraction seismograms and associated depths.

The transmitter-receiver spacing is made sufficiently large to insure that the first pulse received is that refracted by the borehole wall, so that the seismic velocity of the formations traversed is indicated on the film directly.

It is an object of this invention to provide a logging apparatus of the type described in said co-pending application and said patent, said apparatus comprising at least two alternately firing transmitters and a receiver responsive thereto, or at least one transmitter and two receivers responsive to said transmitter. The arrangement comprising one transmitter and two receivers is particularly advantageous for the purposes of this invention since it measures the time interval between two events of the same kind—namely, between the arrivals of an impulse to the first and then to the second receiver—instead of measuring the time interval between events of different kinds—namely, the start of an impulse at a transmitter, and its arrival to a receiver. Time measurements of the first type can be carried with much greater accuracy than those of the second type.

It is a particular object of this invention to provide an apparatus comprising control circuit means for preventing any intermixing of energy from the two receivers resulting in undecipherable records, which is effected by automatically disconnecting either of said receivers from the recording instruments at an instant when an acoustic impulse from a transmitter has reached said receiver but before it has reached the other receiver, or by increasing the amplitude of the signals from one of the receivers as compared with the other receiver, or by other means, as will appear hereinbelow.

These and other objects of this invention will be understood from the following description taken with reference to the attached drawings, wherein:

FIG. 1 is a diagrammatic view of the present apparatus showing the underground and the surface portions thereof;

FIG. 2 is a diagrammatic view in cross-section of a preferred embodiment of the present transmitter;

FIG. 3 is a diagrammatic view in cross-section of the present receiver;

FIG. 5 is a simplified block diagram of the recording or surface portion of the present apparatus;

FIG. 6 shows a photographic frame or seismogram such as obtained by means of the present apparatus;

Figure 4:
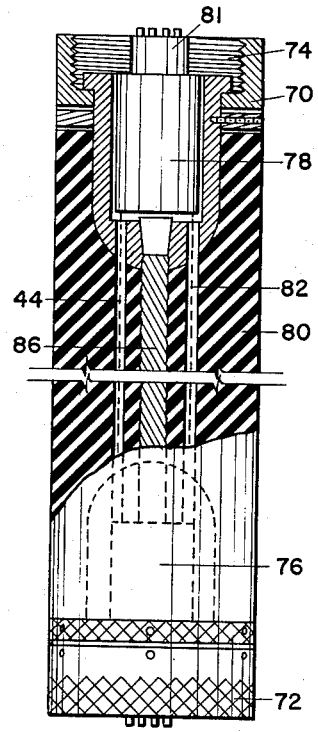
FIG. 4 is a diagrammatic view partly in cross-section of a link member forming part of the present apparatus.

Referring to FIG. 1, the apparatus of the present invention involves an arrangement generally similar to that of my copending application Serial No. 284,867 and Patent 2,651,027. This comprises an elongated tubular housing, generally designated by the numeral 2, adapted to be lowered into a borehole at the end of a cable 4, preferably a coaxial or multiconductor insulated cable. The cable 4 passes over a suitably powered and calibrated reel 6, which may be coupled or associated with a Selsyn generator 7. The cable 4 is electrically connected to a surface unit 8, comprising the desired amplifying, synchronizing and indicating or recording elements. The reel 6, or preferably the output of the Selsyn generator 7, is electrically connected to the unit 8 through a conductor 10 in order that the depth or level of the housing 2 may be measured or recorded at any instant together with the desired indications from said housing, as will appear hereinbelow.

The housing 2 consists of a plurality of tubular members, preferably held in fluid-tight screw-threaded engagement with each other. These members may comprise an upper head connector 12, through which mechanical and electrical connection is effected between the housing 2 and the cable 4, an upper instrument case 14, transmitter T, a link member 16, which is preferably made flexible, an upper receiver $R_1$, a second link member 18, a lower receiver $R_2$, a third link member 20, a lower instrument case 22, and a bottom closure head 24, which may comprise a lead sinker weight such as 50 lbs.

The basic elements of the present apparatus are the transmitter T and the receivers $R_1$ and $R_2$. The purpose of the instrument cases 14 and 22 is to accommodate, in pressure-tight manner, the auxiliary electric and electronic equipment necessary for the operation of the transmitters and the receivers such as batteries, timing and relay circuits, amplifiers, etc. diagrammatically indicated at 26 and 27. In particular, the capacitor banks necessary, for example, to produce a spark discharge at the transmitter, are indicated at 28 and 29 respectively. The purpose of the link members 16, 18 and 20 is to serve as electrical and mechanical connectors between the transmitter and the receivers while also accommodating a part of the auxiliary operating equipment, such as batteries and preamplifiers, as will appear hereinbelow.

The axial length of each of the sections 14 and 22 may vary from 2 to 4 feet, while that of the link members 16, 18 and 20 should be at least 3 feet and may be much longer, such as 30 ft. or more, the normal distance between adjoining receivers and the transmitter being preferably about 5 feet. The transmitter and receivers may each have a length of from 1 to 2 feet, so that the whole housing 2 has a length of at least 25 feet, and may be considerably longer. If desired, a second transmitter may be connected into the apparatus between elements 20 and 22.

The transmitter T is shown in greater detail in FIG. 2. The transmitter comprises similar upper and lower heads 30 and 32, having external screw threads 34 for attachment to the other units of the housing 2. The two heads are held together at a fixed axial distance from each other by means of a plurality of bars 36, attached to said heads in any desired manner, as by welding, screw-threads, etc. The central bore 38 of either of the heads has installed therein an insulated plug 40, having any desired number of prongs, electrodes or terminals 42 whereby electrical power may be supplied to the transmitter by means of electrical connectors and/or conductors diagrammatically indicated by the dotted lines 44. The bars 36 are made tubular to serve as conduits for the conductors 44, so that proper power distribution may be maintained between the various units of the housing 2. A bushing 46, suitably affixed within the head 32, carries a stem 48 supporting a pair of contacts 50 to which a suitable potential is applied through plugs 40 and conductors 44 to produce a spark discharge therebetween, as will be described hereinbelow.

The bushing 46 and a similar bushing 52 affixed to the head 30 have an elastic or flexible cylindrical diaphragm or partition 54, made of synthetic rubber or any suitable plastic material, connected between them in a fluid tight manner. The chamber 55 which is formed within the partition 54 is preferably filled with a clean fluid, such as silicone grease or oil, in which the contacts 50, which may be carbon contacts, are immersed.

The receiver units $R_1$ and $R_2$, shown in detail in FIG. 3, are in general similar to the transmitter T and will be briefly described here only as to the elements in which they differ therefrom.

The bushing 56 carries a cylindrical member 58, of which at least the upper portion 60 is molded of hard rubber, plastic or similar material. Passing through the solid rubber cylinder 60 and embedded therein is an insulated conductor cable 62 electrically connected to a pressure sensitive element 64, such for example as a stack of piezo-electric tourmaline discs. A flexible boot 66, preferably made of synthetic rubber, is pulled over the cylinder 60 and affixed thereto in fluid-tight manner. The space 67, formed within the tip of the boot 66 is filled with a suitable fluid, such as silicone grease or oil, and serves as a housing for the pressure sensitive element 64.

FIG. 4 shows diagrammatically the structure of the link members 16, 18 and 20. These members comprise metallic upper and lower heads 70 and 72 provided with internal screw-threads 74 for attachment to the other units of the housing 2. Each of the heads has formed therein a chamber 76 adapted to receive a container with necessary auxiliary electric equipment, such as batteries, amplifiers, etc. as indicated at 78. Electrical connections with the rest of the apparatus of housing 2 are established by means of plugs 81.

Fitted or molded between the heads 70 and 72 is a rubber sleeve 80 having therein a plurality of channels 82 for the electrical conductors diagrammatically shown by the dotted lines 44. The two heads are preferably held together by means of a steel chain or cable 86 leaded in or otherwise fixedly attached to said heads. The cable 86 may, however, be dispensed with in apparatus designed for operations at shallow depth, the rubber sleeve 80 having sufficient mechanical strength for such operations.

The purpose of inserting flexible members 16, 18 and 20 into the apparatus 2 is twofold: first, to give the apparatus sufficient flexibility for operation in crooked boreholes, especially when housing 2 has a considerable total length, and, second and most important, to provide a resilient linkage between the transmitter and the receivers in order to prevent the impulses from the transmitters from reaching the receivers through any rigid metallic members connected therebetween instead of reaching them through the formations surrounding the borehole.

Although photo-oscillographic recording is preferably used in the present velocity logging method as the most flexible and informative tool, other recording means may be used without departing from the spirit of this invention. For example, methods well known in the art may be used for converting varying time intervals into varying direct currents, which are used to produce continuous smooth curves. Likewise, conventional circuits adapted to display the amplitudes of the impulses received, or the ratios of said amplitudes, may be readily constructed by those skilled in the art. For simplicity, however, the present invention will be described with regard to the use of photo-oscillographic recording means.

The surface indicating or recording unit 8 of FIG. 1 is basically the same as that described in my copending application Serial No. 284,867. As diagrammatically shown in FIG. 5, this unit comprises a cable terminal network 90 connected to the cable 4 and including all necessary filter circuits and amplifiers; a main power supply 92; a synchronizing network 94 including all necessary synchronizing, calibrating and sweep circuits; a cathode ray oscilloscope 96 energized by the output of network 94; a depth indicator 97 connected through cable 10 to the Selsyn generator 7; and a camera 98 electrically connected to the output of the units 94 and 97 and arranged to photograph the indications of the oscilloscope 96.

In operation, the housing 2 is moved through the borehole at a desired, preferably substantially constant speed, such as from 50 to 150 feet per minute. The depth is determined at any instant from the indications of the Selsyn generator 7, transmitted to the depth indicator 97 and the recorder camera 98. Spark discharges are produced at the transmitter at desired intervals. The spacing between each consecutive discharge may be a function of depth (for example, every 5 feet of travel of the housing 2) or of time (for example, every 2 seconds). Spark discharges are produced by charging the capacitor banks 28 and 29 by current supplied from power supply 92 through cable 4. The capacitors are then discharged through the electrode contacts 50 of the transmitter T by means of the timing and relay circuits 26 and 27, which are in turn actuated by energizing signals delivered thereto at proper time intervals from the surface and determined by a proper setting of the synchronizing unit 94, as will appear hereinbelow and as more fully described in my copending application Serial No. 284,867 and Patent 2,651,027.

The spark discharge through the liquid in which the electrodes 50 are immersed produces an impulse having a very steep front, which impulse is transmitted through the diaphragm 54 to the borehole fluid on the other side of the diaphragm. The impulse then travels to the borehole wall where it is partially refracted and partially reflected.

Referring to FIG. 1 and assuming that the spark discharge had occurred at transmitter T, the impulse or seismic wave travels toward the two receivers $R_1$ and $R_2$ both through the formation and the fluid in the borehole, the velocity of travel through the formation being of a considerably higher order than through the borehole fluid. At approximately the level of the receiver $R_1$, a part of the energy of the impulse traveling through the formation is again transmitted through the borehole fluid, the rubber diaphragm 66 and the fluid in chamber 67 to the piezo-electric element 64 of receiver $R_1$ being converted thereby to an electric pulse which is conveyed after amplification to the surface through the cable 4. The rest of the energy of the impulse continues to travel toward the receiver $R_2$ which it reaches in a manner and along a path similar to that described with regard to the receiver $R_1$. A second electric pulse is accordingly produced by receiver $R_2$ and is similarly conveyed to the surface through the cable 4.

The pulses or signals produced by the receivers $R_1$ and $R_2$ are first amplified by the amplifier or pre-amplifier stages carried by the housing 2 in compartments 26 and 27 of FIG. 1 and 76 of FIG. 4. This permits the pulses to be transmitted through the cable 4 to the surface apparatus without excessive attenuation. The signals are then delivered to the cable termination and filter circuits of unit 90, which unit effects the separation of the energizing power from unit 92, the actuating impulses from the synchronizing network 94, and the incoming signals from the receivers. Each signal is then further amplified by amplifiers which may either form independent units, or be incorporated in unit 90, as shown for simplicity in FIG. 5.

The amplified signals are then directed through the synchronizing network 94 to the oscilloscope 96 and the camera 98, setting these units in operation after a short delay, for example, 0.5 second, during which the cycle of recording, depth indication, sweep calibration, film feed, etc. may take place. For example, pulses from sweep circuits forming part of the synchronizing network 94, upon actuation by the signal receiver, may be used to turn on the beam of the cathode ray oscilloscope, thus eliminating the recording of stray light on the camera film in the intervals between successive recordings. The synchronizing unit 94 also supplies to the camera 98 the necessary energizing pulses to control the film feed. The depth indicator 97, energized by the Selsyn generator 7, applies a proper depth mark to each signal from the receivers recorded on the film of the camera 98. All these operations are of conventional nature and will not be described here in detail as not forming part of the present invention.

Upon the arrival of the signal to the oscilloscope 96, the transient oscillations which appear on the cathode ray screen are photographed by the recorder camera 98 to give a record such as illustrated in FIG. 6.

FIG. 6 shows a strip of film 100 carrying a timing line or scale 102 thereon, each of the divisions 104 marked on said scale being of an order such as $10^{-4}$ second. 106 is the record line formed by the sound pulse from the transmitter T. The transient oscillation corresponding to the arrival of the sound impulse to receiver $R_1$ is indicated at 110, and that due to the arrival of the same impulse to receiver $R_2$ is indicated at 112. 108 is the record line formed due to the discharge of a spark by a second transmitter $T_2$ (if such receiver is used), which discharges approximately .05 second after T. The transient oscillation corresponding to the arrival of the second sound impulse to receiver $R_2$ is indicated at 114, and that due to the arrival of said second impulse to receiver $R_1$ is indicated at 116. A mark 118, giving the exact depth in feet of the center point of the housing 2 is printed on the film directly by the depth indicator 97. The complete velocity logging record of a well or of a portion thereof consists of a plurality of seismograms similar to that of FIG. 6 preferably recorded on a single film of any desired length.

Since the transient oscillations produced at receiver $R_1$ and shown at 110 FIG. 6 may sometimes have time constants resulting in delay periods well in excess of the values of the time of travel of an impulse between $R_1$ and $R_2$, it is essential to dampen said oscillations to an amplitude negligible as compared with that of impulses 112 produced at receiver $R_2$, or otherwise to reduce said amplitude substantially to zero before the impulses 112 appear on the oscilloscope screen, since the intermixing of the energy of these oscillations would result in unintelligible seismograms. Several methods are therefore provided according to the present invention to differentiate between the responses of the two receivers.

It has been found that a convenient way of achieving the desired result consists in alternately disconnecting the receiver $R_2$ from the cable 4 and thus from the recording units at the surface. This will be understood by reference to FIG. 8, wherein the transmitter and receivers T, $R_1$ and $R_2$ and the operating circuits associated therewith are designated by numerals 122, 126 and 128, respectively. The transmitter T is connected to energizing power conductors 130, while the receivers $R_1$ and $R_2$ are connected to signal conductors 132. It is, however, understood that the transmitters and receivers may be connected to the surface through the same pair of conductors by using proper filters in the unit 90. The conductors 130 and 132 are in turn connected, through the instrument case 14, to the cable 4 and thus to units 90 and 92 or 90 and 94, respectively.

The connection between the cable and the receiver $R_1$ is effected by means switching relay 134 energized through leads 138 from transmitter T.

Figure 8:
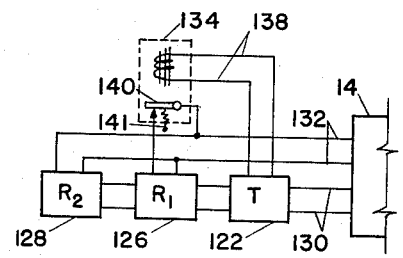

The operation of the circuits of FIG. 8 is as follows: when a spark discharge occurs at transmitter T, a portion of the current surge is used to energize the relay 134 with a time delay chosen so that switch 140 opens after the seismic impulse due to the spark discharge has reached receiver $R_1$, but before it has reached receiver $R_2$, thereby disconnecting receiver $R_1$ before the oscillation 112 appears on the oscilloscope screen and thus preventing the mixing up of energies of impulses 110 and 112. The relay switch is self-resetting as diagrammatically indicated by means of springs 141.

Figure 7:
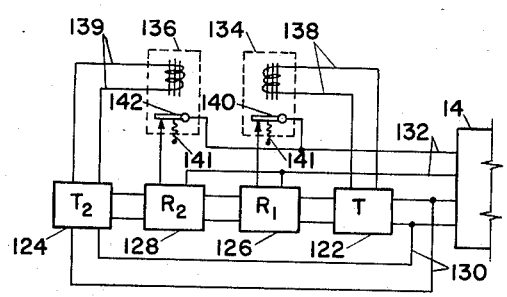
FIGS. 7 and 8 are block diagrams illustrating control circuit means for selectively disconnecting a receiver in response to a transmitter discharge, FIG. 7 showing a system with two transmitters and FIG. 8 a system with a single transmitter.

A system corresponding to that of FIG. 8 but employing a second transmitter $T_2$ adapted to control receiver $R_2$ through leads 139 by means of relay elements 136 and 142, corresponding to elements 134 and 140 is shown in FIG. 7.

The above-described method of switching one receiver off before an impulse has reached the other receiver is used according to the present invention because of the poor quality of commercially available well logging cable, wherein so much cross-coupling occurs between any two pairs of conductors that the signals become mixed and unintelligible. Given a properly engineered multiconductor cable, it is possible to bring to the surface signals from the separate receivers by means of separate conductor pairs.

Figure 12:
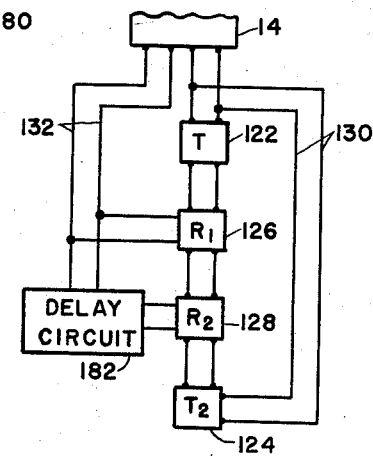
FIGS. 12 and 13 are block diagrams of alternative control circuit means for differentiating between the responses of the two receivers.

It is also possible to separate signals from the two receivers by incorporating into the present system a time delay network 182, as shown in FIG. 12, said network being connected between one of the receivers, e.g. $R_2$, and the cable conductors 132. The network 182 is designed to delay the signal from the receiver $R_2$ by a sufficiently long interval to eliminate interference between the two electrical signals from receivers $R_1$ and $R_2$. Thus, although these two signals are produced very soon one after another by the impinging acoustic pulses, they are sent up the cable at time intervals sufficiently spaced to prevent interference. Such delay intervals should be approximately 7 milliseconds for the case of three equal five foot intervals between the transmitting and receiving elements, 7 milliseconds being approximately the time required after the production of a sound pulse for the pulse at the farthest detector to decay to a negligible amplitude.

It is further possible to separate signals on the basis of their amplitude. In such case, the preamplifier circuits are preferably so arranged and controlled that the receiver farthest from the transmitter produces a signal of much larger amplitude than the other receiver. Thus referring to FIGS. 1 or 6, as transmitter T (or transmitters T and $T_2$) fires in succession, a signal of a larger amplitude is produced and sent up the cable by receivers $R_2$ and $R_1$, respectively. A circuit suitable for carrying out this method is diagrammatically shown in FIG. 13, wherein the same numerals are used to indicate the same elements as in FIG. 8. The circuit of FIG. 13 comprises essentially a double pole, double throw relay 186 whereby the resistances 188 and 190 of receivers $R_1$ and $R_2$ are alternately connected and disconnected with the cable conductors 132. The energizing coil 192 of the relay is connected across the main or discharge capacitor of transmitter T. The relay 186 is shown in its position just before T fires, while its main capacitor or capacitor bank is still charged. After this capacitor has discharged, coil 192 becomes de-energized, and the position of the contacts is reversed by the springs 194 and 196, preferably after a short delay of the order of .002 second. The type of record obtained with the arrangement of FIG. 13 is shown in FIG. 14, events identical to those of FIG. 6 being indicated by the same numerals.

Figure 13:
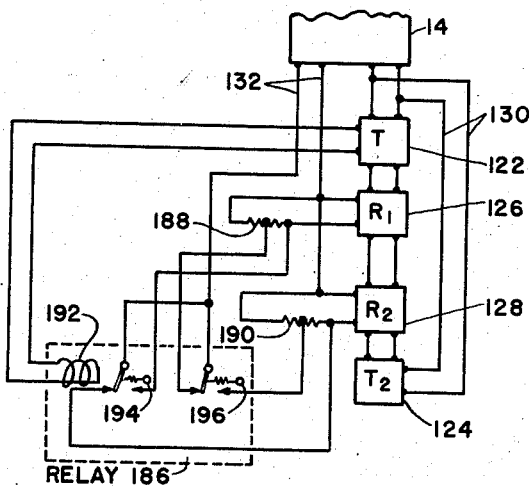
Figure 14:
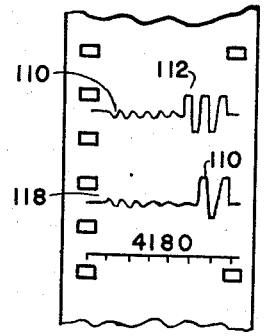
FIG. 14 shows a photographic frame or seismogram obtained by means of the system of FIG. 13.

FIGS. 12 and 13 both illustrate the use of a system with two transmitters. Should it be desired to use a single transmitter system, transmitter $T_2$ shown at 124 can in either case be removed by disconnecting conductors 130. In FIG. 13, the relays can be omitted and the system permanently wired to give the circuit shown in said figure when only one transmitter is used.

Figure 9:
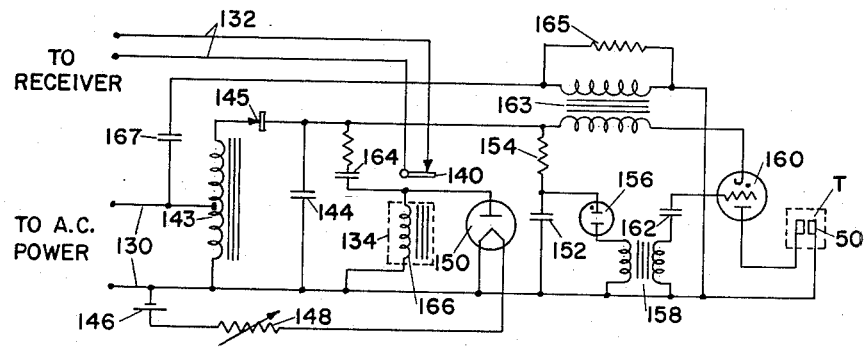
FIG. 9 is a diagram of the circuit means controlling the operation of the transmitters and the receivers of the present invention.

Although many circuits can be used to perform the desired operations in accordance with the present invention, as will be readily understood by those skilled in the art, a circuit involving an arrangement of electronic equipment especially suitable for the desired purpose is diagrammatically shown in FIG. 9, wherein elements shown in other drawings are indicated by the same numerals.

The operation of the circuit of FIG. 9 may be briefly described as follows.

Operating power, for example, a 60 volts, 60 cycle alternating current is supplied from the surface units 92 and 90 through cable 4 and instrument case 14 (not shown in FIG. 9), and is applied through power conductors 130 to a transformer 143 to step up the voltage to a value of the order of 1000 volts. It is then rectified by rectifier 145 to direct current for charging the main discharge capacitor or capacitor bank 144, having a relatively large capacity such as 8 microfarads. When the A.C. current supply is discontinued, for example, in response to an actuating impulse from the synchronizing network 94 of FIG. 5, the capacitor 152, having a value of the order of 0.5 microfarad, continues being charged through the resistance 154 until it is raised to a potential sufficiently high, such for example as 50 and 60 volts to permit the neon tube 156 to ignite. Upon the neon tube 156 becoming conductive, the current pulse passing through the primary of transformer 158 induces in the secondary of said transformer a voltage surge which is sufficiently high to fire the thyratron 160 when applied to the grid thereof through capacitor 162, having for example a value of the order of 0.01 microfarad. When the thyratron is ignited, the main capacitor 144 discharges therethrough and through the contacts 50 of the transmitter, thereby creating the desired spark discharge. The discharge current passing through the primary of transformer 163, produces in the secondary thereof a highly damped pulse, said secondary being shunted with a resistance 165 having a value such as 10 ohms. This damped pulse is transmitted to the surface through a coupling condenser 167 to indicate the initiation of each sound pulse by a spark discharge.

When the thyratron becomes conductive, the condenser 164 discharges through the coil 166 of the relay switch 134, thus causing said switch to open and to disconnect the receiver connected thereto through the signal conductors 132 for the purpose already described hereinabove. A delay control circuit comprising a diode 150, located in the well instrument 2, a current source or battery 146 and a variable resistance 148, located either in the well instrument, or preferably at the surface, serve as a variable resistance shunt to vary in a desired manner the relay sensitivity and time constant, thus varying the speed with which coil 166 opens switch 140. This control is necessary to insure that switch 140 does not open so fast as to eliminate from the record the response of the near receiver, nor so slowly as to allow the response of the near receiver to be intermixed with the response of the far receiver for any given sound pulse produced by the transmitter. For any given setting of the delay control, the range of the velocities that can be satisfactorily measured is determined by the ratio of the sum of spacing between the receivers plus the spacing between a transmitter and a receiver to the spacing between a transmitter and a receiver. Where these spacings are equal (for example, as they are when they are all made equal to 5 feet for normal conditions), the range of velocities measurable for a given setting is 2 to 1. Thus, where seismic velocities vary over a greater range, provision must be made for varying the response of the switching delay from the surface.

The velocity logging apparatus described hereinabove is primarily useful for obtaining accurate velocity surveys for use in interpreting seismic records. Besides yielding precise time-depth data, the present method can be successfully used for accurately locating the depth of reflecting horizons, and for correlating and identifying various rock types. Thus, for example, limestones are distinguishable from shales by the absence of shear waves in shale formations.

Further, the present method and apparatus are applicable for the study of the relation between porosity and velocity. It can be shown that where porosity variations occur without other changes in lithology, significant velocity variations will occur which can readily be measured with the present method and apparatus. For example, when the seismic velocity is 7,000 feet/sec., the decrease in velocity accompanying a 1 percent increase in porosity can be as much as 0.5 percent; when the velocity is 10,000 feet/sec., the corresponding decrease can be as great as 1 percent.

It is understood that the above description is not to be taken as limiting the present invention in any way except as defined by the claims appended hereto, and that various modifications of the embodiments described hereinabove may be readily effected by those skilled in the art without departing from the spirit of said invention.

Figure 10:
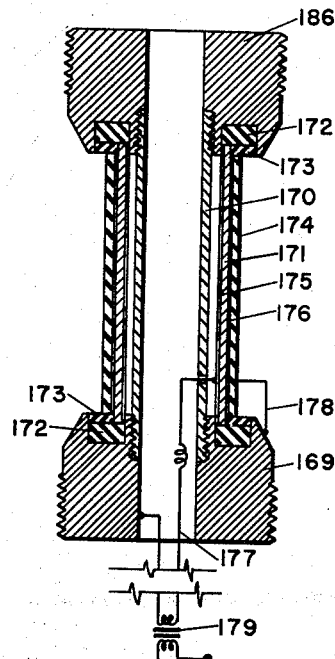
FIG. 10 is a view in cross-section of another form of transmitter element comprising a hollow piezo-electric cylinder.

In particular, the spark type transmitter shown in FIG. 2 may be replaced by another suitable generator of steep front impulses. FIG. 10 shows such a transmitter, comprising steel end-pieces 168 and 169 connectable between the heads 30 and 32 of FIG. 2. These end-pieces are held together by a reinforcing tubular steel member 170. Coaxially surrounding the tube 170 is a hollow cylindrical element 171 made of a piezo-electric material such as barium titanate, which is bonded to the end pieces by means of suitable gasket or packing elements 172 and 173, made of materials such as thermosetting resins and soft rubber. Also bonded to the element 173 is a protective rubber sleeve 174 surrounding the cylinder 171. The inner and outer cylindrical surfaces of 171 are metal plated to form two electrodes 175 and 176, which are connected through leads 177 and 178 and ground 169, to the high-voltage secondary of a transformer 179 whose primary is in turn connected to the condenser discharge circuit, both the transformer and the condenser discharge circuit forming part of the transmitter auxiliary equipment. When the condenser is discharged through the transformer primary, the high voltage produced in the secondary and applied between the electrodes 175 and 176 causes a momentary change of the diameter of the cylinder, thereby producing a cylindrical symmetrically outgoing pulse. Although at low hydrostatic pressures the transmitter of FIG. 10 is somewhat less efficient than the spark transmitter, it is usually more reliable and has a longer life, being moreover able to serve also as a receiver.

Figure 11:
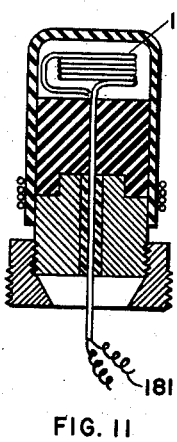
FIG. 11 is a view in cross-section of a further form of transmitter element comprising a loosely wound coil immersed in a liquid.

A still further type of transmitter which may be advantageously used with the present invention is shown in FIG. 11. The essential element of this transmitter is structurally similar to the receiver element shown in FIG. 3 and described with regard thereto. The tourmaline pressure sensitive element 64 of FIG. 3 is, however, replaced by a loosely wound multi-layered helix 180 of insulated wire. This helix is immersed in a liquid which is preferably viscous and of highly magnetic permeability, and is connected by leads 181 to a transformer and discharge capacitor arrangement similar to that described with regard to FIG. 10. When the condenser is discharged through the helical winding 180, the helix momentarily contracts, and the radial thickness of its multi-layered winding decreases. This results in a net volume decrease of the lattice-like structure of the helix, and a corresponding decrease in volume of the viscous liquid entrapped between the turns of wire, the viscosity of the liquid preventing its ready escape therefrom. This results in a rarefaction or negative pressure pulse which is propagated in all directions as an acoustic wave. This transmitter has the important feature of producing appreciable low-frequency energy in the form of non-directional, substantially spherical pressure pulses even when subjected to high hydrostatic pressures.

It is further understood that although the above described arrangement involving one transmitter and two receivers forms because of its simplicity, a preferred embodiment of the present invention, it is equally well possible to apply the principle of said invention (which consists essentially in disconnecting or otherwise rendering ineffective or inoperative as regards interference between first arrival signals one of the receivers before the impulse arrives at the other receiver), in a system such as that described in my copending application Serial No. 284,867, which system comprises two transmitters and two receivers, as illustrated also in FIGS. 7, 12 and 13 of the present application.

I claim as my invention:

1. In a method of seismic velocity measurement, the steps of establishing within a borehole a first and a second receiving station spaced from each other along a substantially vertical line, producing an acoustic impulse at a single point located along said vertical line to one side of said two receiving stations, recording the arrival of said impulse to the station nearest to the origin of said impulse, rendering said station ineffective before said impulse reaches the other station, and recording the arrival of said impulse to said other station in time relationship to the record produced by the arrival of the impulse to the first station.

2. In a method of seismic velocity measurement, the steps of establishing within a borehole a first and a second receiving station spaced from each other along a substantially vertical line, producing an acoustic impulse at a single point located along said vertical line to one side of said two receiving stations, recording the arrival of said impulse to the station nearest to the origin of said impulse, reducing the response of said station to a negligible value before said impulse reaches the other station, and recording the arrival of said impulse to said other station in time relationship to the record produced by the arrival of the impulse to the first station.

3. Apparatus for seismic velocity measurements, comprising a transmitter and two receivers spaced from each other along a substantially vertical line, said receivers being capable of detecting impulses from said transmitter, an electrical network linking the circuits of said transmitter and receivers, means in said network for momentarily energizing said transmitter to produce an acoustic impulse reaching said two receivers in succession, means actuated by the energization of said transmitter for disconnecting from said network at least a portion of the circuit of the receiver nearest to the transmitter after said impulse has reached said receiver but before it has reached the other receiver, and means energized by said network for recording the impulses detected by said receivers.

4. In a system for seismic measurements, surface apparatus comprising a recording unit, subsurface apparatus adapted to be lowered into a borehole, a conductor cable supporting said subsurface apparatus, said subsurface apparatus comprising a transmitter and two receivers spaced from each other along a vertical line, both said receivers being mounted to one side of said transmitter, electric circuit means comprising said conductor cable connecting said transmitter and said receivers to the surface apparatus, means in said circuit means for energizing said transmitter to produce acoustic impulses traveling past the two receivers, means at each receiver for translating said impulses into electric signals, and switching means in said circuit means energized by said transmitter for periodically changing the intensity of the signals transmitted from the receivers to the recording unit in the surface apparatus.

5. In a system for seismic measurements, surface apparatus comprising a recording unit, subsurface apparatus adapted to be lowered into a borehole, a conductor cable supporting said subsurface apparatus, said subsurface apparatus comprising a transmitter and two receivers spaced from each other along a vertical line, said receivers being mounted to one side of said transmitter, an electric circuit comprising said conductor cable connecting said transmitter and said receivers to the surface apparatus, means in said circuit for energizing said transmitter to produce an acoustic impulse reaching said two receivers in succession, means in said circuit actuated by the energization of said transmitter for disconnecting the receiver nearest to said transmitter after said impulses has reached said receiver but before it has reached the other receiver, and means at each receiver for translating said impulses into electric signals.

6. In a system for seismic measurements, surface apparatus comprising a recording unit, subsurface apparatus adapted to be lowered into a borehole, means supporting said subsurface apparatus in said borehole, said subsurface apparatus comprising an acoustic wave source and two receivers spaced from each other along a vertical line, said receivers being mounted to one side of said wave source, a single electric circuit means connecting both said receivers to said recording unit, means for energizing said wave source to produce an acoustic impulse reaching said two receivers in succession, means in each receiver for translating each received impulse into a separate signal related to the impulse travel time, said separate electrical signals each being transmitted by said circuit means to said recording unit, and switching means in said subsurface apparatus actuated upon the production of said acoustic impulse for disconnecting the receiver nearest to said wave source from said circuit means.

7. In a system for seismic measurements, surface apparatus comprising a recording unit, subsurface apparatus adapted to be lowered into a borehole, means supporting said subsurface apparatus in said borehole, said subsurface apparatus comprising an acoustic wave source and two receivers disposed along a common substantially vertical axis, said receivers being spaced from each other and mounted to one side of said wave source, a single electric circuit means coupling both said receivers to said recording unit, means for energizing said wave source to produce an acoustic impulse reaching said two receivers in succession, means in each receiver for translating each received impulse into a separate signal related to the impulse travel time, said separate electrical signals each being transmitted by said circuit means to said recording unit, and circuit means in said subsurface apparatus actuated in coordination with the production of said acoustic impulse for effectively silencing the receiver nearest to said wave source after the production of at least the initial portion of said electrical signal.

8. In a borehole logging system, the combination which comprises an exploring unit including a transducer supported for movement along a borehole, an energy source for periodically exciting said transducer to produce acoustic pulses in borehole media adjacent thereto, a pair of acoustic detectors in said exploring unit separated from one another at points spaced from said transducer for generation of voltages in response to said acoustic pulses, a transmission circuit extending from said unit to the earth's surface, means in circuit with said energy source for effectively connecting first one and then the other of said detectors to said transmission circuit for producing at the earth's surface a first set of voltages comprising pulses spaced in time and dependent upon said acoustic pulses at two points in said borehole, means in said unit for generating electrical pulses comprising a pulse having a predetermined time relation to the generation of each of said acoustic pulses, and means for transmitting to the earth's surface a second voltage comprising said electrical pulses.

9. In a system for logging a borehole, the combination which comprises an acoustic transducer means for producing acoustic pulses in said borehole, a pair of acoustic detectors separated from one another at points spaced different distances from said transducer means for generating voltage pulses spaced in time in response to arrival of said acoustic pulses at said detectors, a transmission circuit, circiut completing means within said borehole for effectively connecting first one and then the other of said detectors to said transmission circuit for transmission to the earth's surface of said voltage pulses and means at the earth's surface connected to said transmission circuit for recording time intervals between the voltage pulses corresponding to one of said acoustic pulses.

10. In a method of logging a well the steps of:
disposing a group of three acoustic impulse transducers at points spaced along the axis of a borehole with, respectively, a transmitter and a receiver at the ends of the group;

producing and receiving acoustic impulses that are, in succession, produced and recieved by adjacent transducers in said group and produced and received by nonadjacent transducers in said group;

after the production of each of said acoustic impulses, transmitting electrical signals related to the impulse appearance times from the transducer at which the impulse is then appearing while preventing the transmission of electrical signals from other transducers in said group;

during said productions and receptions of acosutic impulses, transmitting electrical signals from the transducers to a surface location in time correspondence with the appearances of the acoustic impulses in the transducers in which they are produced and received;

at said surface location, measuring time intervals between pairs of said electrical signals that correspond to events of the same kind that occur in said productions and receptions of acoustic impulses.

11. In a system for logging wells in which an acoustic wave source and a pair of acoustic wave receivers are arranged at spaced points in the well, said receivers being spaced at different distances from said source, and the waves generated by said source being detected by said receivers and converted to related signals after transmission through the formations into which the well extends, the improvement comprising:

means for operating said source periodically to cause a train of acoustic waves to appear thereat, enter into the formations and appear at the receiver nearest said source, said waves in addition being transmitted to the receiver farthest from the source;

a signal conductor for transmitting to the surface said related receiver signals;

a control circuit for producing a control pulse in coordination with one of said appearances of said acoustic waves;

a switching means connected to said control circuit; and means controlled by said control pulse for operating said switching means periodically to disconnect the receiver nearest said source from said conductor within a period occurring after the receiver nearest said source has transmitted at least the initial portion of one receiver signal associated with each depth interval being logged.

12. In a method for logging a borehole the steps of:
establishing within the borehole first and second receiving stations spaced along a substantially straight line;

producing acoustic impulses at points located along said straight line a different fixed distance from each of said receiving stations;

connecting and disconnecting one of said receiving stations to and from a circuit means for transmitting to a surface located recording system electrical signals that indicate the arrivals at said receiving stations of said acoustical impulses;

actuating said connecting and disconnecting in coordination with the production of said acoustic impulses at instants preventing the intermingling of said electrical signals; and recording quantities corresponding to the time intervals between the arrivals, at said receiving stations, of said acoustic impulses.

13. In a system for logging a well in which system at least an acoustic wave source and a pair of acoustic wave receivers are arranged at spaced points in the well, said receivers being disposed at different distances from said source and the waves generated by said source being detected by said receivers and converted to separate electrical signals that are related in time to the arrival of said waves after said waves have traveled through the formations surrounding the well, said receivers being spaced a distance that results in the slower waves arriving at the receiver nearer the source after the initial waves have arrived at the receiver farther from the source, the improvement in said system comprising:

means coupled to said source for operating said source periodically to generate acoustic impulses which are transmitted therefrom into the formations;
a circuit means coupled to said receivers for transmitting each of said separate arrival time-related electrical signals to the surface of the well;
a signal control circuit coupled to said circuit means, said signal control circuit periodically disconnecting said circuit means from one of said receivers after said receiver has transmitted at least the initial portion of said one receiver signal associated with each depth interval being logged.

14. In a system for acoustic measurements:
surface apparatus comprising a recording unit;
subsurface apparatus adapted to be lowered into a borehole,
said subsurface apparatus including a transmitter and at least one receiver;
subsurface means associated with said receiver for translating said acoustical impulses into separate electrical signals related in time to the arrivals of said acoustical impulses at the receivers;
a conductor cable supporting said subsurface apparatus;
electric circuit means including said conductor cable connecting said transmitter and receiver to the surface apparatus;
means in said circuit means for energizing said transmitter to produce acoustic impulses traveling past said receiver;
a signal control circuit connected to said circuit means for actuation in coordination with the production of said acoustic impulses for effectively silencing said receiver after a preselected portion of each of said separate electrical signals has been transmitted to the surface.

15. In a well logging system in which at least three acoustic transducers are disposed within a well for producing acoustic impulses and converting acoustic impulses into voltage impulses at locations sequentially adjacent to and non-adjacent to the transducer at which the impulses are generated:

means coupled to at least one of said transducers for operating it periodically to generate acoustic impulses;
surface-located measuring and recording elements;
circuit means coupled to said transducers for transmitting to said surface-located measuring and recording elements separate electrical signals that are related to the times of the appearances of the acoustic impulses at said transducers;
a downhole signal control circuit coupled to said circuit means and disposed for effectively disconnecting and reconnecting one of said transducers relative to said circuit means in coordination with the production of said acoustic impulses.

16. In a system for logging a borehole, the combination which comprises at least three acoustic transducer means including at least one transducer means for producing acoustic pulses in said borehole, at least one acoustic transducer means for detecting the arrivals of acoustic impulses at a point located within said borehole, means for maintaining at least one pair of said transducer means at different distances from a third one of said transducer means, means associated with said transducer means for generating voltage pulses spaced in time in response to appearances of said acoustic pulses at said transducer means, a transmission circuit, a control circuit means within said borehole for effectively connecting first one and then the other of said transducer means to said transmission circuit for transmission to the earth's surface of said voltage pulses and means at the earth's surface connected to said transmission circuit for recording time intervals between the voltage pulses corresponding to one of said acoustic pulses.

17. A system for seismic measurements:
surface apparatus comprising a recording unit;
a subsurface apparatus adapted to be lowered into the borehole, means for supporting said subsurface apparatus in the borehole, said subsurface apparatus comprising an acoustical wave source and two receivers spaced from each other along a vertical line, said receivers being mounted to one side of said wave source;
a single electrical circuit means for connecting said receivers to said recording unit, means for energizing said wave source to produce an acoustical impulse reaching said two receivers in succession, means in each receiver for translating said impulse into a separate signal related in time to the arrival of said impulse at the respective receiver, said separate electrical signals each being transmitted by said circuit means to said recording unit; and
switching means in said subsurface apparatus actuated in coordination with the production of said acoustic impulse for disconnecting one of said receivers from said circuit means.

18. In a system for seismic measurements, surface apparatus comprising a recording unit, subsurface apparatus adapted to be lowered into a borehole, means supporting said subsurface apparatus in said borehole, said subsurface apparatus comprising an acoustic wave source and two recievers spaced from each other along a vertical line, said receivers being mounted to one side of said wave source, a single electric circuit means connecting both said receivers to said recording unit, means for energizing said wave source to produce an acoustic impulse reaching said two receivers in succession, means in each receiver for translating said impulse into an electric signal to be transmitted by said circuit means to said recording unit, and switching means in said subsurface apparatus actuated upon the production of said acoustic impulse for disconnecting the receiver nearest to said wave source from said circuit means after said acoustic impulse has reached said receiver and before said acoustic impulse has reached the other receiver.

References Cited by the Examiner
UNITED STATES PATENTS

| | | | |
|---|---|---|---|
| 2,191,119 | 2/40 | Schlumberger | 181—0.5 |
| 2,233,992 | 3/41 | Wyckoff | 181—0.5 |
| 2,275,736 | 3/42 | Cloud | 181—0.5 |
| 2,651,027 | 9/53 | Vogel | 181—0.5 X |
| 2,708,485 | 5/55 | Vogel | 181—0.5 |
| 2,931,455 | 4/60 | Loofbourrow | 340—18 X |

SAMUEL FEINBERG, *Primary Examiner.*

ISAAC LISANN, MILTON BUCHLER, *Examiners.*